US011153029B2

United States Patent
Vlachou et al.

(10) Patent No.: US 11,153,029 B2
(45) Date of Patent: Oct. 19, 2021

(54) INTERFERENCE-AWARE LINK-RATE ADAPTATION FOR WIRELESS COMMUNICATION

(71) Applicant: Hewlett Packard Enterprise Development LP, Houston, TX (US)

(72) Inventors: Christina Vlachou, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 53 days.

(21) Appl. No.: 16/502,936

(22) Filed: Jul. 3, 2019

(65) Prior Publication Data

US 2021/0006348 A1 Jan. 7, 2021

(51) Int. Cl.
*H04L 1/00* (2006.01)
*H04W 74/08* (2009.01)
*H04W 16/14* (2009.01)

(52) U.S. Cl.
CPC .......... *H04L 1/0003* (2013.01); *H04L 1/0009* (2013.01); *H04W 16/14* (2013.01); *H04W 74/0816* (2013.01)

(58) Field of Classification Search
CPC .... H04W 68/00; H04W 76/28; H04L 5/0048; H04L 12/2876; H04N 13/20
See application file for complete search history.

(56) References Cited

U.S. PATENT DOCUMENTS

| 10,123,345 | B2 | 11/2018 | Narashima et al. |
| 2016/0135135 | A1* | 5/2016 | Yoo ........................ H04W 16/18 370/350 |
| 2016/0345345 | A1* | 11/2016 | Malik ................... H04W 16/14 |
| 2018/0063851 | A1* | 3/2018 | Abraham .............. H04W 72/06 |

FOREIGN PATENT DOCUMENTS

WO 20150187860 A1 12/2015

OTHER PUBLICATIONS

Abinader et al., "Enabling the Coexistence of LTE and Wi-Fi in Unlicensed Bands", IEEE Communications Magazine, Nov. 2014, 9 pages.

(Continued)

*Primary Examiner* — Iqbal Zaidi
(74) *Attorney, Agent, or Firm* — Jaffery Watson Mendonsa & Hamilton

(57) ABSTRACT

Embodiments are directed to interference-aware link-rate adaptation for wireless communication. An embodiment of a storage medium includes instructions to operations including receiving data regarding wireless signals received by an access point, the access point to provide Wi-Fi communication, the wireless signals being communicated in an unlicensed radio spectrum; performing spectral analysis of the received wireless signals to identify a channel of an LTE (Long-Term Evolution) signal; and upon determining that energy level of the LTE signal is below an energy detection (ED) level and that the channel is a primary Wi-Fi channel for the access point, adapting a link rate for the access point based on channel state information for the channel.

15 Claims, 6 Drawing Sheets

(56) References Cited

OTHER PUBLICATIONS

Anwar et al., "Loss differentiation: Moving onto high-speed wireless LANs", IEEE, 2014, 10 pages.
Arslan et al., "ACORN: An Auto-Configuration Framework for 802.11n WLANs", IEEE/ACM Transactions on Networking, IEEE, vol. 21(3), Jun. 2013, pp. 896-909.
Aruba Networks, "Dashboard Monitoring", Chapter 13, available online at <https://web.archive.org/web/20170925152003/https://www.arubanetworks.com/techdocs/ArubaOS_61/ArubaOS_61_UG/Dashboard_Monitoring.php>, Sep. 25, 2017, 5 pages.
Aruba networks, "Spectrum Analysis", available online at <https://web.archive.org/web/20180326162131/http://www.arubanetworks.com/techdocs/ArubaOS_61/ArubaOS_61_UG/Spectrum_Analysis.php>, Mar. 26, 2018, 42 pages.
Chai et al., "LTE in Unlicensed Spectrum: Are We There Yet?", MobiCom'16, ACM, Oct. 3-7, 2016, pp. 135-148.
Cisco Meraki, "Spectrum Analysis Overview", available online at <https://documentation.meraki.com/MR/Radio_Settings/Spectrum_Analysis_Overview>, 2018, pp. 1-2.
ETSI, "GHz RLAN; Harmonised Standard covering the essential requirements of article 3.2 of Directive 2014/53/EU", Draft ETSI EN 301 893 V2.0.7, Nov. 2016, pp. 1-123.
Giupponi et al., "Simulating LTE and Wi-Fi Coexistence in Unlicensed Spectrum with ns-3", Research Gate, Apr. 2016, 13 pages.
Jindal et al., "LTE and Wi-Fi in Unlicensed Spectrum: A Coexistence Study", Comments of Google Inc., Jun. 11, 2015, 36 pages.
Linux Wireless, "Existing Linux Wireless drivers", available online at <https://wireless.wiki.kernel.org/en/users/drivers>, Dec. 12, 2018, 3 pages.
Makris et al., "Measuring LTE and WiFi coexistence in Unlicensed spectrum", IEEE, Research Gate, Jun. 2017, 7 pages.
Martha DeGrasse, "Verizon starts nationwide LAA deployment", available online at <https://www.rcrwireless.com/20170804/carriers/verizon-starts-nationwide-laa-deployment-tag4>, Aug. 4, 2017, 5 pages.
Olbrich et al., "WiPLUS: Towards LTE-U Interference Detection, Assessment and Mitigation in 802.11 Networks", IEEE, 2017, 9 pages.

Pefkianakis et al., "MIMO Rate Adaptation in 802.11n Wireless Networks", MobiComl '10, ACM, Sep. 20-24, 2010, 12 pages.
Rayanchu et al., "Airshark: Detecting Non-WiFi RF Devices using Commodity WiFi Hardware", IMC'11, ACM, 2011, 14 pages.
Rayanchu et al., "Catching whales and minnows using WiFiNet: deconstructing non-WiFi interference using WiFi hardware", Research Gate, Apr. 2012, 15 pages.
Rayanchu et al., "FLUID: Improving Throughputs in Enterprise Wireless LANs through Flexible Channelization", MobiCom'11, ACM, Sep. 19-23, 2011, 12 pages.
Sheshadri et al., "BLU: Blue-printing Interference for Robust LTE Access in Unlicensed Spectrum", CoNEXT '17, ACM, 2017, pp. 15-27.
Simic et al., "Measurement Study of IEEE 802.11ac Wi-Fi Performance in High Density Indoor Deployments: Are Wider Channels Always Better?", IEEE, 2017, 9 pages.
Sun et al., "Bringing Mobility-Awareness to WLANs using PHY Layer Information", CoNEXT'14, ACM, Dec. 2-5, 2014, pp. 53-65.
Sur et al., "Practical MU-MIMO User Selection on 802.11ac Commodity Networks", MobiCom'16, ACM, 2016, pp. 122-134.
T-Mobile, "T-Mobile Continues to Boost Capacity for Customers with LTE-U Launching in Spring 2017", available online at<https://www.t-mobile.com/news/lte-u-launch>, Feb. 21, 2017, 4 pages.
Vlachou et al., "LTERadar: Towards LTE-Aware Wi-Fi Access Points", Article 33, SIGMETRICS'18, ACM, Jun. 18-22, 2018, pp. 78-80.
Yun et al., "Supporting WiFi and LTE Co-existence", INFOCOM, 2015, 9 pages.
Zeng et al., "A First Look at 802.11ac in Action: Energy Efficiency and Interference Characterization", IFIP, 2014, pp. 1-9.
Leivadeas, A. et al., "Link Adaptation for Fair Coexistence of Wi-fi and LAA-LTE", Aug. 16, 2018, pp. 43-50.
Yeonchul Shin et al., "InFRA: Interference-aware PHY/FEC Rate Adaptation for Video Multicast ofver WLAN", Apr. 14, 2017, 9 pages.
Kim,S. et al. "Collision-Aware Rate Adaptation in Multi-rate WLANS: Design and Implementation", Dec. 2010, pp. 3011-3030.

* cited by examiner

INTERFERENCE-AWARE LINK-RATE ADAPTATION FOR WIRELESS COMMUNICATION

BACKGROUND

The use of available radio spectrums continues to grow, thus generating certain conflicts or competition in usage. In particular, LTE (Long-Term Evolution) operation in the 5 GHz Unlicensed Spectrum, and specifically LTE-U (LTE-Unlicensed, or LTE in Unlicensed Spectrum) and LAA (Licensed Assisted Access) technologies, is expected to grow in the future as the licensed spectrum becomes increasingly crowded.

For cellular operators, this offers a desirable solution enabling them to harness the "free" unlicensed bands together with a primary licensed cell using carrier aggregation. Certain carriers have deployed LTE unlicensed solutions by leveraging commodity end-user compliant devices. It is expected that LTE-U/LAA small cells utilizing unlicensed radio spectrum will become common in environments such as enterprises, stadiums, auditoriums, and campuses.

However, LTE-U/LAA create a fundamental challenge for coexistence with existing technologies in these radio bands, with the main challenge being IEEE 802.11ac wireless networking based WLANs.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to interference-aware link-rate adaptation for wireless communication.

In some embodiments, an apparatus, system, or process operates to enhances the coexistence of LTE and Wi-Fi signal transmissions under hidden terminals. The apparatus, system, or process is to assist the commodity rate control algorithms to distinguish between collisions and bad channel conditions. Under collisions, commodity APs commonly drop the PHY rate significantly, especially under LTE interference. In some embodiments, channel state information and collision-aware error-rate adaptation are used to improve rate control on access point firmware. In some embodiments, performance of access points may be improved by avoiding unneeded reductions in data speed through the provision of intelligent rate adaptation based on channel conditions. Implementations may be particularly valuable in changing conditions, in which transmitting sources may be moved or modified in operation, thus creating new potential interferences in unlicensed radio spectrum that can slow or disrupt W-Fi operation.

LTE in the unlicensed 5 GHz band is being deployed by mobile operators to provide for increased capacity that is needed for expanded data usage by cellular users. However, LTE signal interference causes Wi-Fi performance to degrade, thus harming 802.11ac high-throughput features. In some embodiments, an apparatus, system, or process for commodity enterprise Wi-Fi access points provides interference-aware link-rate adaptation utilizing channel state information to detect, quantify, and react to LTE interference and thus provide for improved performance in operation. An access point commonly maintains channel state information (CSI), wherein the CSI the represents the signal propagation effects in a communication channel. In some embodiments, an embodiment enables fair coexistence of a Wi-Fi access point without requiring modification of the LTE PHY/MAC, and while remaining in compliance with the 802.11ac standard. In some embodiments, an interference-aware link-rate adaptation system is based on lightweight per-link interference detection, and enables Wi-Fi APs to mitigate LTE degradation with minimal overhead.

As used herein, access point (AP) (also referred to as a wireless access point (WAP)) refers to a Wi-Fi networking hardware device that allows Wi-Fi devices to connect to a wired network, including connection to the Internet or an intranet. The AP may connect to a router (via a wired network) as a standalone device, or may be an integral component of the router itself.

As further used herein, a commodity access point is an access point that is sold as a commodity in general commerce, while an enterprise access point refers in general to access points that are utilized at an enterprise scale for larger operations.

Figure 1:
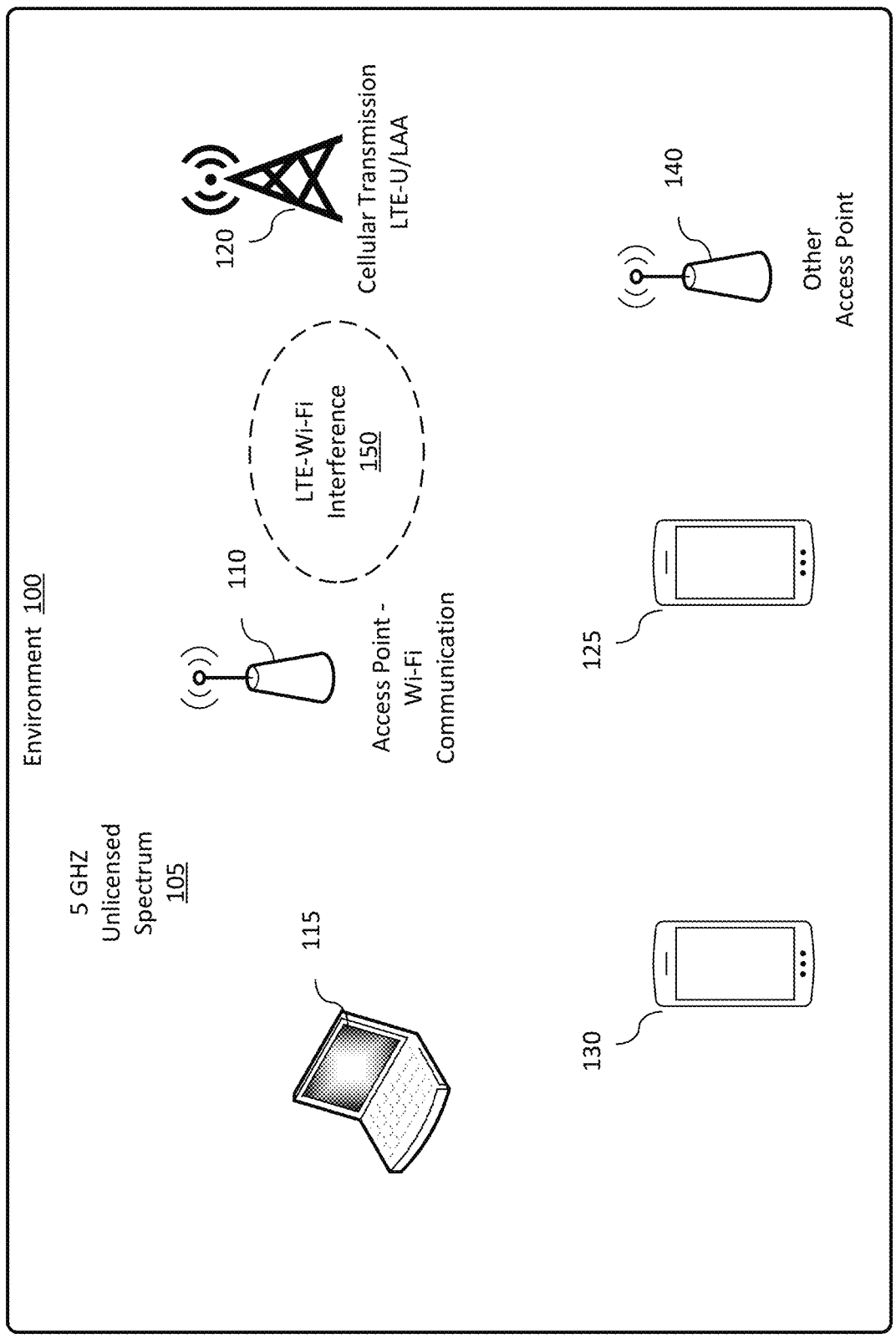
FIG. 1 is an illustration of an environment including elements broadcasting in unlicensed radio spectrum.

FIG. 1 is an illustration of an environment including elements broadcasting in unlicensed radio spectrum. In a particular physical or geographic environment 100 there may be multiple elements operating in the 5 GHz (Gigahertz) Unlicensed Spectrum 105. In some embodiments, an access point 110 provides for interference-aware link-rate adaptation for wireless communication, including, for example, communication with one or more Wi-Fi devices such as computers 115 and multiple other elements that are not illustrated in FIG. 1.

However, the use of the unlicensed radio spectrum may include cellular transmission shown by cellular transmitter 120, which may include signal transmission utilizing either LTE-U or LAA. The cellular transmitter may include an LTE small cell operating in or near the environment. Also illustrated are cellular device 125 and 130, which may also be receiving W-Fi communications via the access point 110. As a result, there may be LTE-Wi-Fi interference 150, causing degradation in performance of the access point 110. Further, there may be one or more additional access points 140, which also provide potential for interference in operation.

LTE's centralized control architecture and frequency/time division based MAC (Media Access Control) sublayer creates issues with regard to coexistence with Wi-Fi, which utilizes randomized medium access (CSMA/CA). Both LTE-U and LAA have MAC schemes that are directed towards coexistence. While LTE-U uses a duty cycling approach to allocate some airtime to Wi-Fi, LAA uses Listen-Before-Talk (LBT), similar to CSMA/CA.

However, the existing coexistence schemes have been shown to have deficiencies in throughput or latency of fair resource allocation. The core underlying reason for such deficiencies is the inherent deafness (inability to decode) of Wi-Fi and LTE-U/LAA to each other's frames. This results in energy-based sensing as being the only available practical mechanism to enable the two technologies to become aware of each other's presence, and this is insufficient to support operational speeds when there are instances of signal collisions.

Figure 2:
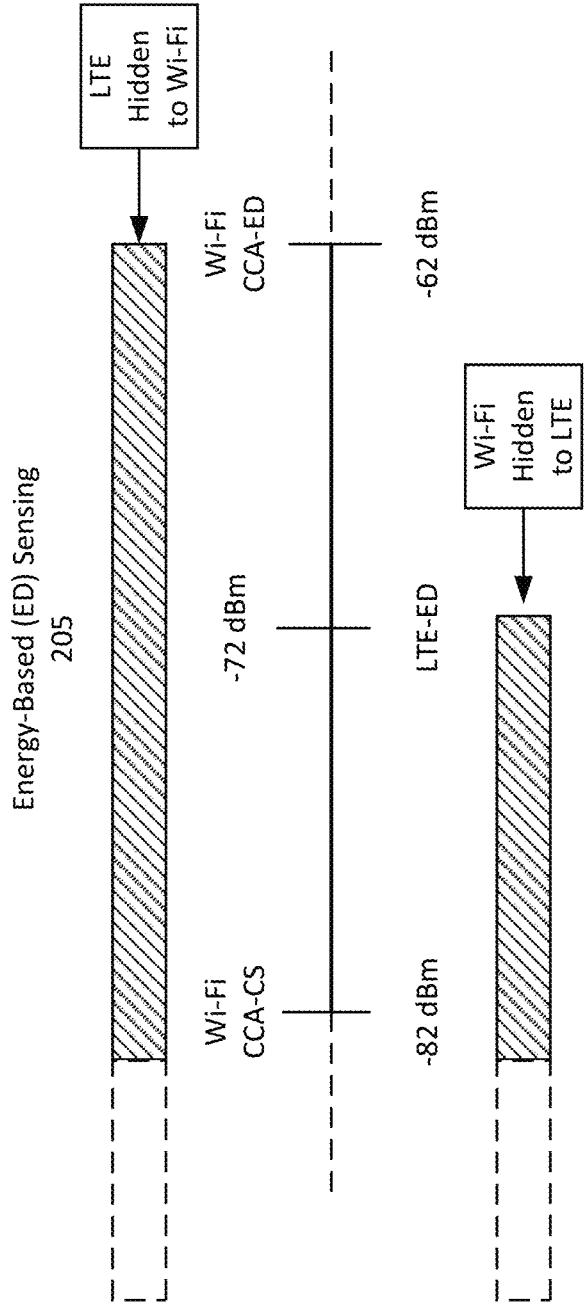
FIG. 2 illustrates different sensitivity thresholds for energy detection (ED) sensing for LTE and Wi-Fi technologies in clear channel assessment (CCA)

FIG. 2 illustrates different sensitivity thresholds for energy detection (ED) sensing for LTE and Wi-Fi technologies in clear channel assessment (CCA). FIG. 2 further illustrates potential hidden-terminal issues due to the interplay among these thresholds. As shown in FIG. 2, Wi-Fi CCA-ED threshold is −62 dBm (decibel milliwatts), with W-Fi CCA-CS being −82 dBm. This results in LTE being hidden to Wi-Fi below −62 dBm. Further, LTE-ED threshold is −72 dBm, resulting in Wi-Fi-being hidden to LTE below this threshold.

Although LAA's LBT mechanism may operate to provide better coexistence between the two technologies, LBT still relies on a static energy detection threshold (LTE-ED in FIG. 1) of −72 dBm to detect Wi-Fi transmissions. In a typical WLAN scenario in which there are multiple APs with different transmission-power settings coexisting with LTE-U/LAA, there will be scenarios where LBT cannot detect Wi-Fi's frames, leading to collisions at clients where LAA transmissions are strong enough to cause interference. In scenarios where LAA transmissions are below the Wi-Fi CCA-ED threshold, Wi-Fi clients will generally suffer the worst degradation, often experiencing complete disconnection.

Both LTE-U and LAA utilize a channel selection algorithm that activates a channel when LTE downlink traffic demand is high. The channel selection implementation is left to the vendor and usually relies on beacon and channel-utilization estimations by a collocated AP at the eNodeB (LTE base station). LTE-U does not respect Wi-Fi transmissions in operation as LTE-U activates and deactivates the unlicensed cell at predefined intervals with a transmission duration of up to 20 ms. The LTE-U duty cycle is adapted to sense Wi-Fi channel utilization by a carrier sense adaptive transmission (CSAT) algorithm, but this does not prevent signal interference. In contrast to LTE-U, LAA (LTE in unlicensed standard by 3GPP) implements listen-before-talk (CSMA/CA (Carrier Sense Multiple Access with Collision Avoidance)) in the 5 GHz. band. LAA's parameters, such as energy thresholds and contention window values, are similar to those of Wi-Fi for fair coexistence. However, LAA does not enforce Wi-Fi preamble detections or control packet transmissions (e.g., RTS/CTS (Request To Send/Clear To Send)). This factor thus can cause severe coexistence issues under hidden terminals.

Further, to enable Gbps (Gigabit Per Second) speeds, the IEEE (Institute of Electrical and Electronics Engineers) 802.11ac standard incorporates certain very-high throughput (VHT) features. APs dynamically adapt VHT features based on packet error rate (PER). For this reason, the operation of the VHT features can be adversely affected by aggressive collisions that are caused by competing operations such as LTE-U and LAA. LTE can harm crucial 802.11ac VHT features when the access point is not able to perform LTE energy detection. In some embodiments, an LTE interference mitigation apparatus, system, or process is to revert LTE degradation on affected clients. The apparatus, system, or process may be utilized to satisfy some or all the following goals: (1) compliance with the 802.11ac standard 2) lightweight implementation (which may be required given limited firmware space, tens of connected clients per AP, and high 802.11ac rates) (3) seamless operations for non-affected stations 4) fairness (at least 50% airtime) to LTE by either channel adaptation or airtime reduction. The apparatus, system, or process may be applied to either or both of LTE-U and LAA.

In operation, commodity APs may utilize rate adaptation (RA) algorithms, such as or similar to Minstrel, with the RA algorithm being responsible for selecting bandwidth, number of spatial streams (SS), and a modulation and coding scheme (MCS) index. These elements are then utilized in determining the transmission rate for the access point. The RA algorithm assumes monotonicity of PER vs. PHY rates, and thus transmission rates can be significantly affected by LTE signal collisions or hidden terminals that cause packet errors.

It is noted that a platform may enable RTS/CTS upon packet failure for retransmission. However, while RTS/CTS can assist with hidden Wi-Fi terminals, this generally does not assist with hidden LTE terminals. The RA algorithm may, for example, cause a drop in the MCS (Modulation and Coding Scheme) index value from 7 to 0 in response to LTE hidden terminals, thus causing a 10× reduction in performance. The RA algorithm also determines the frame aggregation limit, i.e., the number of subframes to be transmitted into a single frame transmission. In a particular implementation, the maximum transmission duration is 4 ms, and hence the aggregation limit depends on the MCS index value. The sub-frame error rate (SFER) is the proportion of corrupted sub-frames in a single frame transmission, and PER computations in the AP's firmware are based on SFER.

Further, the IEEE 802.11ac standard enables dynamic bandwidth adaptation by bonding multiple 20-MHz channels for 40/80/160 MHz operations. Bandwidth control can fall back to a reduced bandwidth if one of the secondary 20 MHz channels is sensed to be occupied or if PER increases. For this reason, LTE operation on the primary Wi-Fi channel can cause Wi-Fi to unnecessarily drop bandwidth for certain clients, and in particular for clients that are experiencing low SINR (Signal to Interference plus Noise Ratio).

In a typical firmware/hardware design, rate control can disable a channel width under high PER, and probe the channel again later. The RA algorithm passes 1-3 rates (one per channel width) to hardware via indirection functions. The hardware performs CCA (Clear Channel Assessment) and optionally enhanced RTS/CTS to determine which channel chunks are clear. After CCA, the hardware transmits the frame at the appropriate bandwidth and at the rate determined by the firmware.

In some embodiments, an access point is to mitigate performance degradation caused by LTE interference by employing channel state information and collision-aware error-rate adaptation. To this end, LTE-U interference and its impact on different Wi-Fi clients is to be detected. Commodity enterprise-grade APs generally utilize spectrum analysis for non-Wi-Fi interference detection. With tens of classifiers, such APs are capable of distinguishing between interferers such as microwave ovens, cordless bases, and frequency hoppers. An apparatus, system, or process includes a spectrum analyzer to support interference-aware link-rate adaptation for wireless communication. In this regard, LTE interference detection by commodity APs has recently been addressed by LTERadar, which uses spectrum analysis.

While an access point may operate to detect LTE, this is not sufficient in itself because, for a given AP, there is high variation in the impact of LTE-U on different clients. In some embodiments, a per link detection strategy is imposed to avoid harming unaffected clients. In some embodiments, AP-level detection tools are used in conjunction with interference-aware link-rate adaptation. In such operation, hints received from spectrum monitors may be utilized trigger a system embodiment, which then starts a per-link detection process for each served client to quantify the impact of LTE-U, and to provide an appropriate response.

In some embodiments, an apparatus, system, or process is to provide interference-aware link-rate adaptation to address LTE interference for cases in which the LTE received signal strength is above or below Wi-Fi CCA-ED as follows.

Reaction Above CCA-ED: In some embodiments, interference detection, as described above, is applied, with spectral analysis yielding a center frequency of the interferer. When LTE energy is above CCA-ED and LTE is on the primary Wi-Fi channel, this does not harm 802.11ac features. When LTE instead operates on a secondary Wi-Fi channel, the AP is to track of the number of the affected stations. In some embodiments, an apparatus, system, or process, in circumstances when LTE is above CCA-ED, is to enable an efficient spectrum allocation when LTE is on a secondary channel. Further, if the proportion of affected clients is significant (e.g., 50%), the AP may blacklist the LTE channel and either reduce bandwidth or change channel. It is possible to achieve close to 10× performance gains (i.e., throughput of VHT40 is 105 Mbps after mode reset versus 11 Mbps for VHT80) for affected clients with LTE on secondary channel by switching channel or VHT mode.

Reaction Below CCA-ED: In some embodiments, an apparatus, system, or process is to implement interference-aware rate control in the AP's firmware. In some embodiments, collisions that increase SFER and force the firmware to drop the PHY rates are to be detected. Severe collisions with LTE may be hinted at by high excessive retries such as (>41%). However, excessive retries in rate control can also result from infeasible selection of MCS/SS/bandwidth, such cases are to be identified.

In some embodiments, interference-aware rate control at least in part uses CSI (Channel State Information) to determine the maximum supported MCS as follows: (1) If monitored metrics hint LTE interference on the primary channel, the rate control starts requesting CSI samples. To avoid significant overhead of CSI requests, the apparatus, system or process may request, e.g., 10 samples per detection interval (e.g. 300 packets) and determine the optimal MCS from IEEE 802.11ac MCS/SNR tables. SNR is estimated as the median SNR amplitude over all subcarriers. (2) After excessive retries, commodity firmware typically is to add a severe negative bias for the specific tried rate (e.g., 30% additional PER). In some embodiments, this bias is modified and does not increase PER if excessive retries result from a rate with lower than the supported MCS. In addition, the system does not penalize the bandwidth used in the same transmission, contrary to default rate control. In some embodiments, the apparatus, system, or process highlights that next-generation enterprise WLAN can achieve high gains by using CSI information, especially in dense environments with dynamically varying interference.

In some embodiments, the adaption of a link rate under interference may be further based on traffic type in addition to channel state information. In some embodiments, the access point may have different algorithms for different types of signal traffic.

Signal Detection: Building a per-link detection system is challenging as it needs to be lightweight and run in real-time. Further, the per-link detection should operate without requiring additional hardware (e.g., a dedicated monitoring radio per AP), accessing only metrics that are available on a typical enterprise Wi-Fi AP. In some embodiments, towards this end, a detection strategy relies on using fine-grained loss metrics that are directly accessible in the Wi-Fi AP's rate-control module or other rate control element. The values of these metrics increase under LTE-U's presence for clients that are indeed affected severely, and hence need to use the interference-aware mitigation system. Further, these metrics show little to no increase for scenarios in which default rate control should be allowed to control link parameters for best performance.

Table 1 below illustrates certain detection metrics for link-rate control that may be utilized according to some embodiments:

TABLE 1

Detection Metrics

| Metric | Description |
| --- | --- |
| xRetries (xR) | Number of times rate-control failed to send a frame even after multiple re-transmissions |
| Short Retries (sR) | Number of retries experienced by short/small packets (e.g., RTS-CTS frames) |
| Long Retries (lR) | Number of retries experienced by regular/large packets (e.g., data frames) |

These statistics are collected at the Wi-Fi AP by the rate-control firmware for each served client, and hence are generally available without transmission overheads. In some embodiments, for each Wi-Fi client, in addition to its rate control state variables, certain variables may be implemented to track the long/short/excessive retries, number of transmissions, LTE detection bitmap, channel state information, and bandwidth tried under LTE detection.

Detection Conditions: To keep false positives of LTE interference low, the changes in the values of detection metrics that might occur in regular link operation, when LTE-U is not transmitting, are taken into account. Specifically, with another Wi-Fi AP (such as access point 140 illustrated in FIG. 1) as a hidden interferer, although xRetries and short retries can display similar elevated levels as in the presence of LTE-U, long retries should remain low as, once the Wi-Fi AP under test switches on RTS-CTS protection, data packet loss rates will be reduced. Further, the probing mechanism built into the rate control, which occasionally sends packets at higher MCS before it converges to optimal rate, might temporarily cause a large number of long retries, but in such cases the number of short retries will remain low. Lastly, under less aggressive LTE-U operation, it is possible that a number of xRetries might remain low, as one of the several multiple re-transmissions might indeed succeed, but the number of both long and short retries will remain high.

Based on the above, in some embodiments a combined metric may be applied to differentiate between affected and non-affected clients. Specifically, reaction mechanisms for a client may be engaged if a first detection condition regarding a number of retries required to send a frame is met. In some embodiments, the first detection condition is met if retries meet a first threshold (a threshold for total retries), or if long retries meet a second threshold (a long retries threshold) and short retries also meet a third threshold (a short retries threshold). Expressed in another way, the first detection condition may be met if the following Condition (1) is true:

$$(xR \geq xR_{thresh}) || ((lR \geq lR_{thresh}) \&\& (rR \geq sR_{thresh})) \qquad [1]$$

Where: $xR_{thresh}$=xRetries threshold
$lR_{thresh}$=Long Retries threshold
$sR_{thresh}$=Short Retries threshold In some embodiments, additional detection conditions may be applied prior to employment of additional of link adaptation measures. In operation, $R_{LTE-OFF}$ is the PHY data rate when LTE-U is not operating and $R_{LTE-ON}$ is the PHY rate achieved by the client under LTE-U interference of airtime α. Similarly, $T_{LTE-OFF}$ and $T_{LTE-ON}$ are defined as the application-layer throughput without and with LTE-U presence, respectively. With different link adaptation mechanisms being employed for the cases where LTE-U operates on the Wi-Fi AP's primary channel versus the secondary channel, operations may be defined as follows for the two scenarios:

LTE-U on Wi-Fi's Primary Channel: In some embodiments, the result is positive (i.e., reaction by a system) if a second detection condition regarding the PHY rate under LTE-U operation of the access point is true. In some embodiments, the second condition is met if a ratio between application-layer throughput with and without LTE-U presence is significantly less than the proportion of time without LTE (i.e., 1−α), and the PHY data rate with LTE operation is significantly less than the PHY data rate without LTE operation. Expressed in another way, the second detection condition may be met if the following Condition (2) is true:

$$\left(\frac{T_{LTE-ON}}{T_{LTE-OFF}} \ll 1-\alpha\right) \&\& \left(R_{LTE-ON} \ll R_{LTE-OFF}\right) \qquad [2]$$

When there are no collisions between LTE-U and Wi-Fi transmissions, Wi-Fi links should ideally be able to utilize the channel for the percentage of airtime when LTE-U is not transmitting. However, in some cases TCP (Transmission Control Protocol) performance is severely affected due to consecutive packet losses even though the underlying PHY data rate is not affected. In such cases, an embodiment should not react because the link adaptation is already working optimally. In some embodiments, to account for such cases, the second detection condition is imposed to provide the condition that the AP reacts to provide link-rate adaption only if the PHY data rate under LTE-U operation is much lower than link's natural PHY rate. It is expected that some collisions reduce the PHY rate of the client. However when interference is severe (such as with hidden terminals), it may be observed that the affected clients' rates are much lower. In such cases, the application throughput would be affected as well, and the reaction mechanisms of an embodiment come into effect.

LTE-U on Wi-Fi's Secondary Channel: In this case, a desired reaction to LTE interference involves reducing the bandwidth used by the Wi-Fi link so as not to utilize the channel (as part of the 802.11ac's bonded channel) that is being used by LTE-U. In some embodiments, a decision whether or not to react is based at least in part on a third detection condition comparing the expected PHY data rate after reducing bandwidth with the PHY data rate under LTE-U operation. $BW_{max}$ is the maximum supported bandwidth for a given link and $BW_{LTE}$ is the bandwidth under LTE-U interference. It may be assumed that when bandwidth is reduced from, for example, 80 MHz to 20 or 40 MHz, then the PHY rate is also reduced by the same factor of 4 or 2, respectively. This is an approximation, as when reducing bandwidth from $BW_{max}$ to $BW_{optimal}$, a higher (by 1-2 indexes) MCS index value might be supported. However, an LTE-U affected client typically drops the MCS by much more than 2 indexes due to strong LTE-U interference, and hence moves down beyond the higher supported MCS index values. In some embodiments, a third detection condition is met if a ratio between a PHY data rate with LTE operation and a PHY data rate without LTE operation is significantly less than a ratio between a bandwidth with LTE interference and a maximum supported bandwidth. Expressed in another way, the third detection condition may be met if the following Condition (3) is true:

$$\frac{R_{LTE-ON}}{R_{LTE-OFF}} \ll \frac{BW_{LTE}}{BW_{max}} \qquad [3]$$

In some embodiments, optimal thresholds for the detection metrics may be determined through search over the range of possible values. For example, the following may be utilized:

TABLE 2

Thresholds for Detection Metrics

| Metric | Above CCA-ED | Below CCA-ED |
|---|---|---|
| xRetries (xR) | 0.45 | 0.45 |
| Short Retries (sR) | 0.17 | 0.09 |
| Long Retries (lR) | 0.10 | 0.16 |

Table 2 shows the different sensitivity thresholds adopted by the two technologies for clear channel assessment (CCA), and potential hidden-terminal issues due to the interplay among these thresholds.

Figure 3:
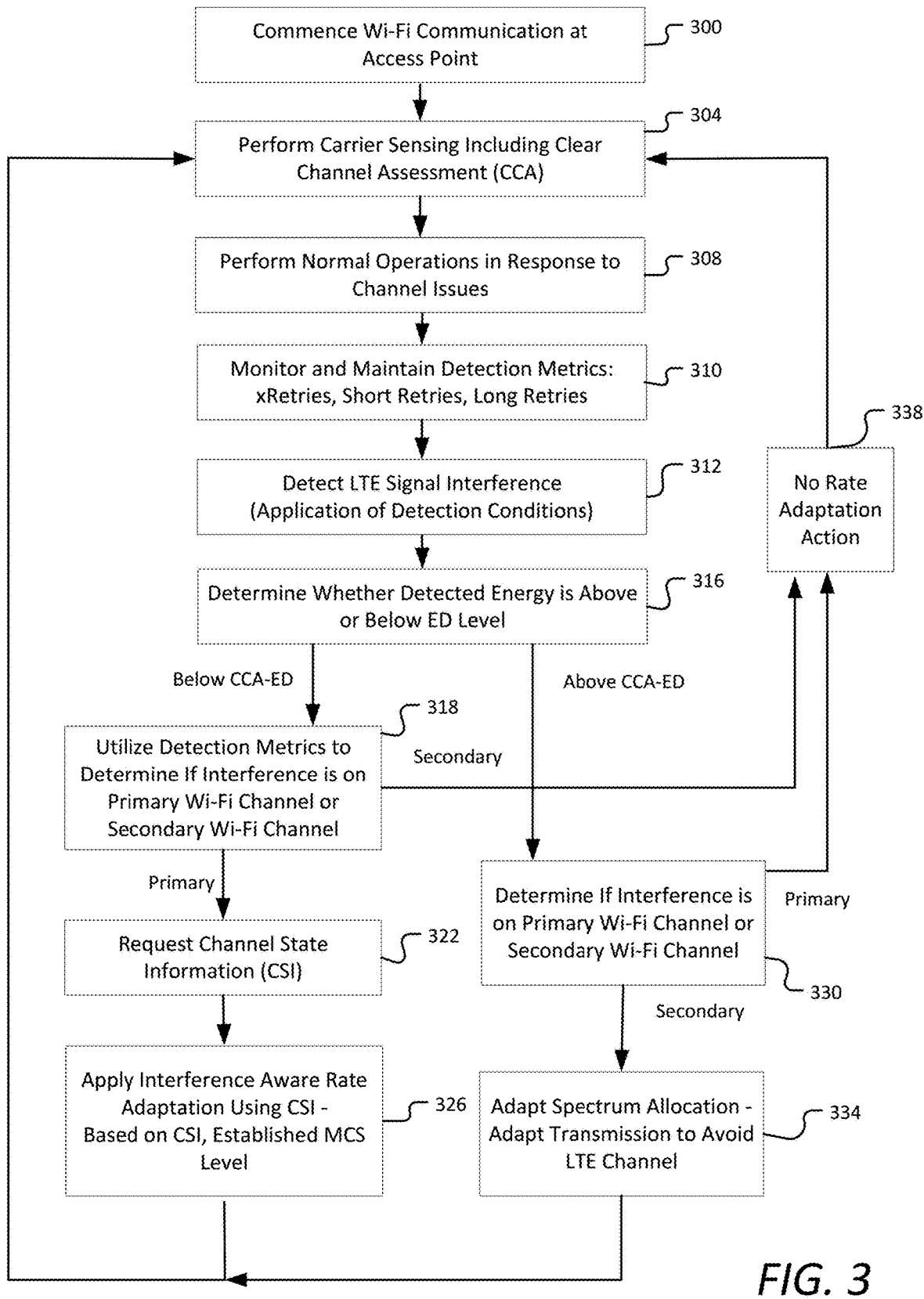
FIG. 3 is a flow chart to illustrate a process for interference-aware link-rate adaptation for wireless communication.

FIG. 3 is a flow chart to illustrate a process for interference-aware link-rate adaptation for wireless communication in some embodiments. In some embodiments, a process to provide for interference-aware link-rate adaptation in an access point includes the following:

Wi-Fi communication may be commenced at the access point 300. The access point is to perform carrier sensing include clear channel assessment (CCA) 304 pursuant to general operations of the access point. The access point may perform normal operation in response to channel issues that are detected 308. In some embodiments, the access point is to monitor and maintain certain detection metrics, wherein the detection metrics may include, but are not limited to, xRetries, short retries, and long retries, such as defined in Table 1 above.

In some embodiments, the access point may detect LTE interference on a Wi-Fi channel 312. The detection of interference may include the application of detection conditions to distinguish between affected and non-affected clients, such as the application of any or all of the first detection condition (based on numbers of retries), the second detection condition (based PHY rate under LTE-U operation), or the third detection condition (based on comparing expected PHY data rate after reducing bandwidth with the PHY data rate under LTE-U operation), as described above.

In some embodiments, there is a determination whether the detected energy of the LTE signal is above or below an energy detection level (the CCA-ED) 316. For an LTE signal that is below the CCA-ED, detection metrics are used to determine if the LTE interference is on the primary Wi-Fi channel or the secondary Wi-Fi channel of the access point 318. If the interference is on the secondary Wi-Fi channel, then no rate adaptation is to be applied 338, and the process may return to carrier sensing 304 and normal operation in response to channel issues 308. If the LTE interference is on the primary Wi-Fi channel, then channel state information (CSI) for the channel is requested 322, and interference-aware rate adaptation is applied, wherein, based at least in part on the CSI for the channel, an appropriate MCS level is established 326. By applying the CSI in such circumstances, the link rate can be supported at a higher rate, thus allowing for improved performance of the access point in LTE interference conditions. In some embodiments, the adaption of a link rate under interference may be further based on traffic type in addition to CSI. In some embodiments, the access point may utilize different algorithms for different types of signal traffic.

Upon determining that the detected energy is above CCA-ED 316, the process continues with a determination whether the LTE interference is on the primary Wi-Fi channel or the secondary Wi-Fi channel. If the interference is on the primary Wi-Fi channel, then no rate adaptation is to be applied 338, and the process may return to carrier sensing 304 and normal operation in response to channel issues 308. If the LTE interference is on the secondary Wi-Fi channel, then the process provides for adapting the spectrum allocation for the access point to avoid the LTE channel 334, thereby avoiding the performance costs caused by the LTE interference.

Figure 4:
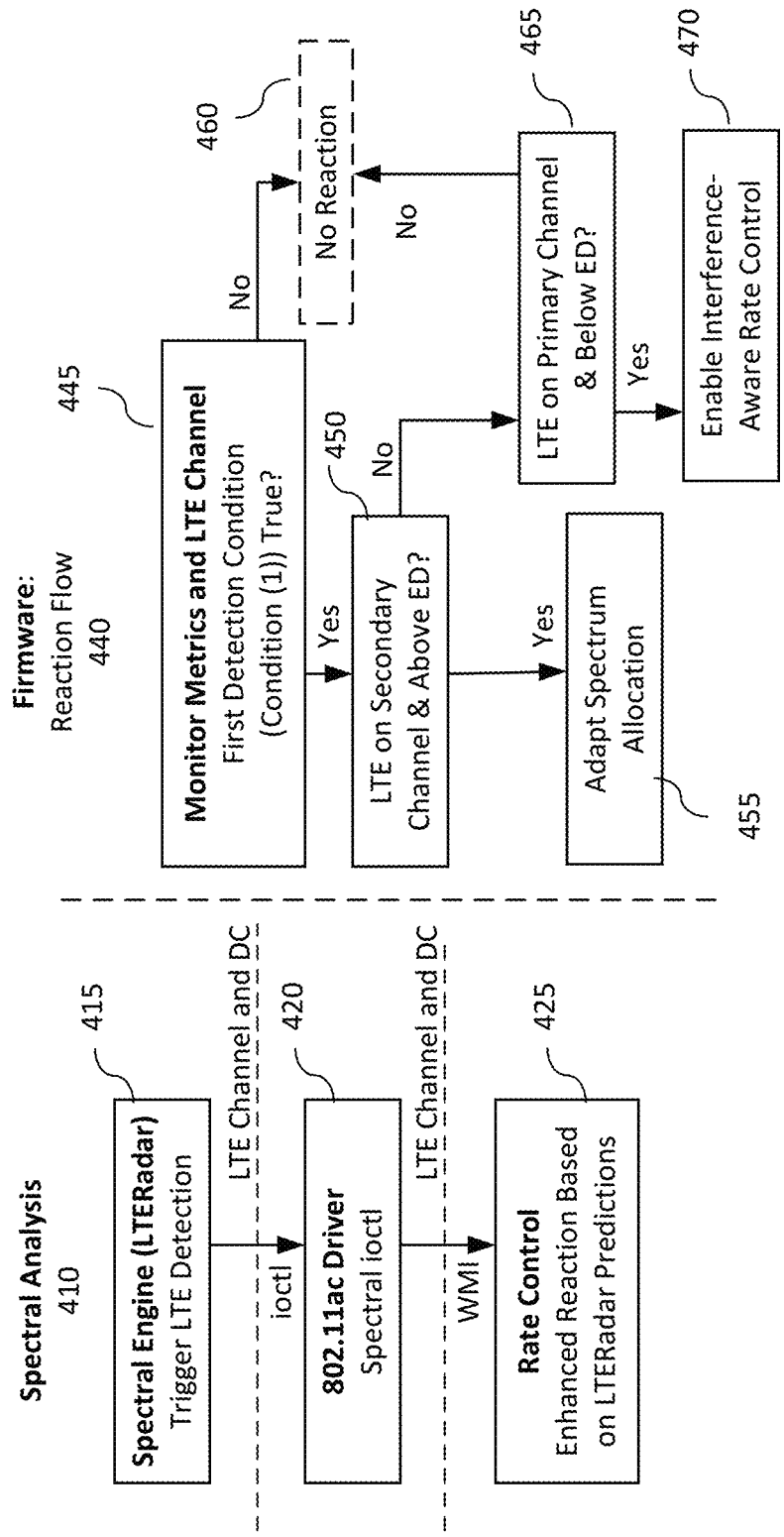
FIG. 4 illustrates a system architecture for interference-aware link-rate adaptation for wireless communication in some embodiments.

FIG. 4 illustrates a system architecture for interference-aware link-rate adaptation for wireless communication in some embodiments. FIG. 4 illustrates the detection and reaction flow running on an access point's firmware and rate control. FIG. 4 illustrates the distinction between the operations for the cases of LTE signal strength above and below ED. As shown in FIG. 4, an AP receives such information from spectral analysis (either running on the same AP or at a separate spectrum monitor, such as a spectrum monitor that is close in distance to a LTE base station that is generating an LTE signal that utilizes unlicensed radio spectrum).

As shown in FIG. 4, a system architecture may include spectral analysis 410 and firmware providing reaction flow 440. In some embodiments, a spectral engine (such as LTERadar) 415 triggers LTE detection, with LTE channel and duty cycle (DC) being passed to firmware. Following the spectral analysis, the spectral engine provides an ioctl (input/output control) signal to 802.11ac (Wi-Fi) driver 420, shown as spectral ioctl. Further, the 802.11ac driver 420 provides WMI (Wireless Module Interface) signal to rate control 425, which provides enhanced reaction based on LTERadar predictions.

Further, the firmware reaction flow 440 includes monitoring detection metrics (such as provided in Table 1) and the LTE channel 445. In some embodiments, there is determination whether a first detection condition regarding a number of retries to send a frame is met 445. In a particular embodiment, the determination is whether Condition (1) (as the condition provided above) is true. If the first detection condition is not true, then there is no reaction 460 by the interference-aware link-rate adaptation system, i.e., additional interference-aware link-rate adaptation measures are not implemented.

If the first detection condition is true, there is a determination whether the LTE is on the secondary channel for W-Fi and is above the energy detection (ED) level 450. If so, the system provides for adapting the spectrum allocation to reduce signal interference 455. If not, then there is a determination whether the LTE is on the primary channel and is below the ED level 465. If not, then there is no reaction 460 by the interference-aware link-rate adaptation system. If LTE is on the primary channel and below the ED level, then interference-aware rate control of the system is enabled 470.

In some embodiments, a solution as illustrated in FIG. 4 is implemented on enterprise-grade APs. The interference mitigation code may be implemented in the rate control class. For each Wi-Fi client, in addition to its rate control state variables, six 8-bit variables are introduced to track the long/short/excessive retries, number of transmissions, LTE detection bitmap, and bandwidth tried under LTE detection. In the rate control class, it is possible to add functions and variables that read channel state information (CSI) from hardware registers and estimate the SNR of any downlink.

In some embodiments, to reduce false positives under no LTE presence, the spectral engine 415 (such as LTERadar) passes LTE channel and duty cycle (DC) data to VHT operations in firmware. As spectral classifications are typically run in an AP's user space, a system is implemented that handles LTE spectral detection to firmware though ioctl calls and a typical wireless module interface (WMI) message (which may be any vendor determined message). FIG. 4 illustrates the detection and reaction flow running on the access point's firmware and rate control. In some embodiments, two cases are distinguished: LTE above ED and LTE below ED. The AP receives such information from spectral analysis (either running on same AP or at a spectrum monitor close to the LTE base station).

Figure 5:
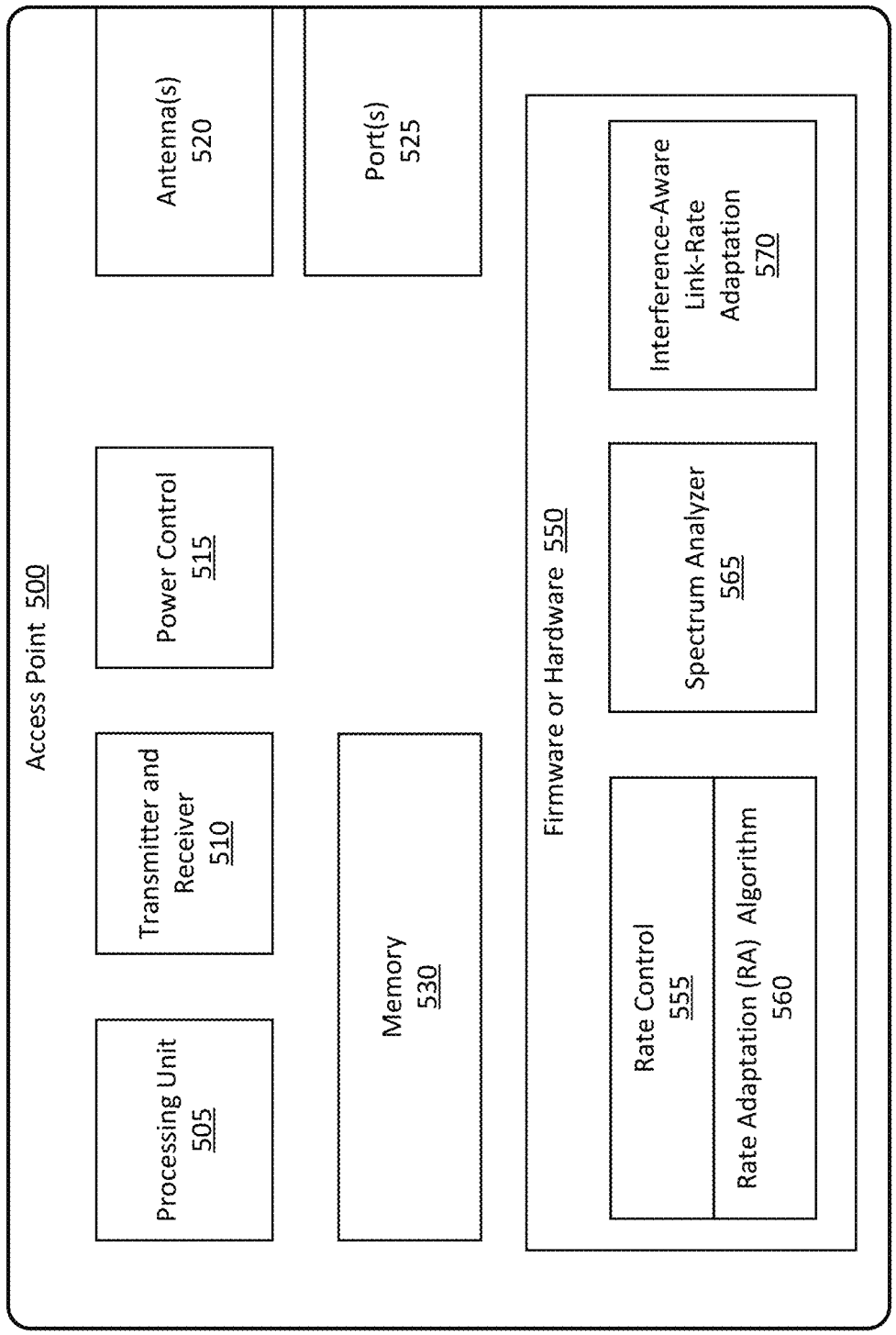
FIG. 5 is block diagram to illustrate an access point according to some embodiments.

FIG. 5 is block diagram to illustrate an access point to provide interference-aware link-rate adaptation according to some embodiments. An access point includes additional components and elements not illustrated in FIG. 5, which is simplified for sake of illustration. The illustrated access point 400 may include an access point (such as an enterprise access point) operating under IEEE 802.11ac or 802.11ax standards, and may include an access point 110 in an environment 100 in which there is LTE-U or LAA transmission in the unlicensed spectrum as illustrated in FIG. 1. In some embodiments, the access point 500 provides for interference-aware link-rate adaptation, such as illustrated in FIG. 4.

In some embodiments, the access point 500 includes a processing unit 505, a transmitter and receiver 510, power control 515, one or more antennas 520 for wireless signal communication, and one or more ports 525 for network connections or other connections. The access point 500 may further include memory 530 for storage of data, which may include volatile and nonvolatile memory (including flash memory and similar elements), registers, and other storage technologies. The memory 530 may include storage of detection metrics, such as the detection metrics provided in Table 1.

In some embodiments, the access point 500 further includes firmware or hardware or both 550 that includes rate control 555 to determine a transmission rate for the access point 500. The rate control 555 includes a rate adaptation (RA) algorithm 560 for selecting bandwidth, number of spatial streams (SS), and modulation and coding scheme (MCS) index, which are utilized in determining the transmission rate. The firmware or hardware 550 further includes a spectrum analyzer 565 to assist in non-Wi-Fi interference detection, wherein the spectrum analyzer 565 may provide for the spectrum analysis 410 as illustrated in FIG. 4.

In some embodiments, the firmware or hardware 550 includes interference-aware link-rate adaptation 570 to assist in support of coexistence between the Wi-Fi operation of the access point 500 with LTE in hidden terminals. In some embodiments, the interference-aware link-rate adaptation 570 provides for the reaction flow 440 as illustrated in FIG. 4 to provide reaction as required in response to LTE interference. In some embodiments, the interference-aware link-rate adaptation 570 further implements the conditions and other elements of link-rate control under varying power and channel conditions as described here.

Figure 6:
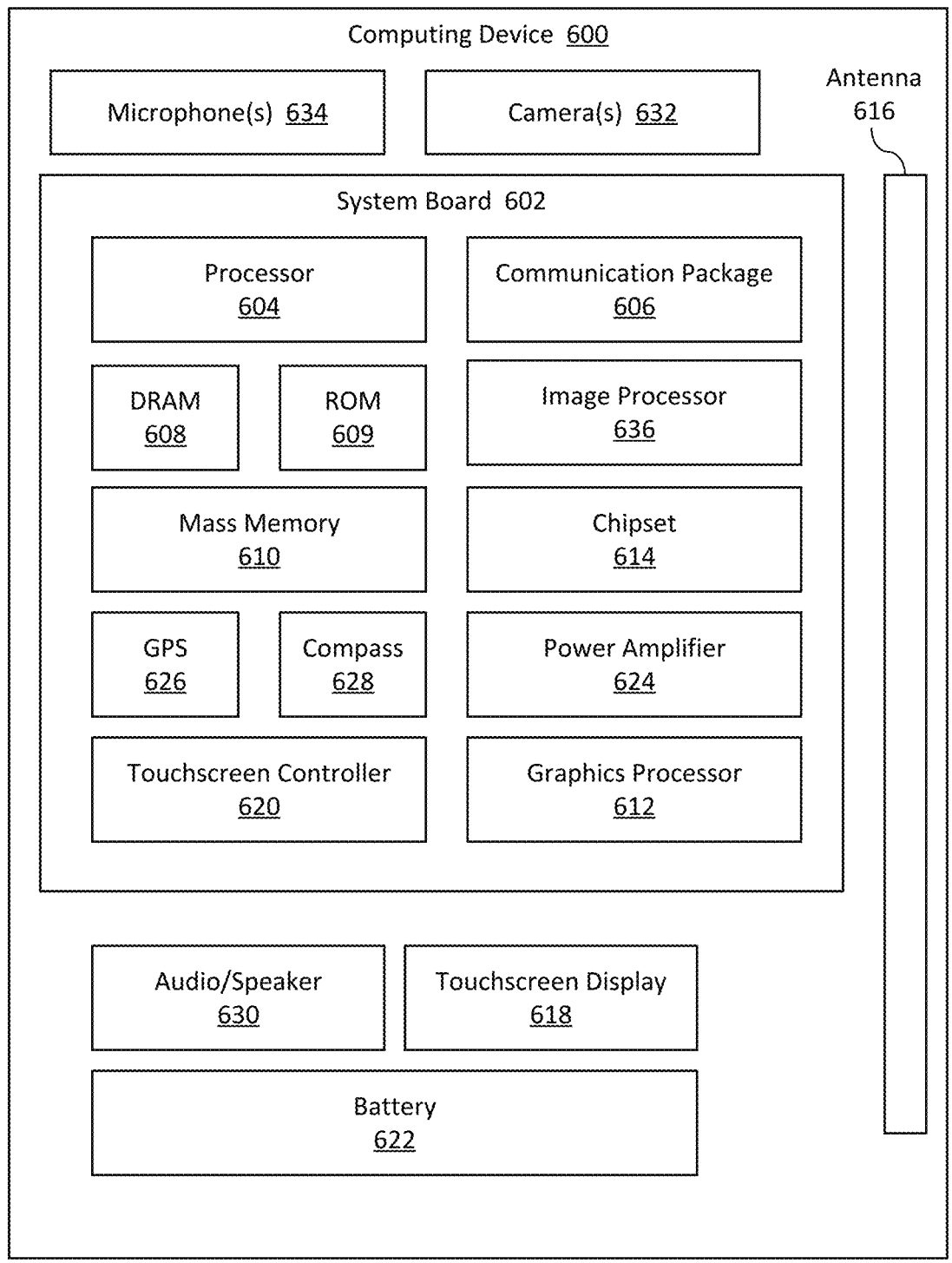
FIG. 6 illustrates a computing device according to some embodiments.

FIG. 6 illustrates a computing device according to some embodiments. In some embodiments, the computing device may include a device to communicate with an access point in network. Computing device 600 houses a system board 602 (which may also be referred to as a motherboard, main circuit board, or other terms). The board 502 may include a number of components, including but not limited to a processor 604 and at least one communication package or chip 606. The communication package 606 is coupled to one or more antennas 616. The processor 604 is physically and electrically coupled to the board 602.

Depending on its applications, computing device 600 may include other components that may or may not be physically and electrically coupled to the board 602. These other components include, but are not limited to, volatile memory (e.g., DRAM) 608, nonvolatile memory (e.g., ROM) 609, flash memory (not shown), a graphics processor 612, a digital signal processor (not shown), a crypto processor (not shown), a chipset 614, an antenna 616, a display 618 such as a touchscreen display, a touchscreen controller 620, a battery 622, an audio codec (not shown), a video codec (not shown), a power amplifier 624, a global positioning system (GPS) device 626, a compass 628, an accelerometer (not shown), a gyroscope (not shown), a speaker or other audio element 630, one or more cameras 632, a microphone array 634, and a mass storage device (such as hard disk drive) 610, compact disk (CD) (not shown), digital versatile disk (DVD) (not shown), and so forth). These components may be connected to the system board 602, mounted to the system board, or combined with any of the other components.

The communication package 606 enables wireless and/or wired communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 606 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 600 may include a plurality of communication packages 606. For instance, a first communication package 606 may be dedicated to shorter range wireless communications such as Wi-Fi and Bluetooth and a second communication package 606 may be dedicated to longer range wireless communications such as GSM, EDGE, GPRS, CDMA, WiMAX, LTE, Ev-DO, and others.

In various implementations, the computing device 600 may be a laptop, a netbook, a notebook, an Ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 600 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, a storage medium includes instructions for receiving data regarding wireless signals received by an access point, the access point to provide Wi-Fi communication, the wireless signals being communicated in an unlicensed radio spectrum; performing spectral analysis of the received wireless signals to identify a channel of an LTE (Long-Term Evolution) signal; and upon determining that energy level of the LTE signal is below an energy detection (ED) level and that the channel is a primary Wi-Fi channel for the access point, adapting a link rate for the access point based on channel state information for the channel.

In some embodiments, access point includes a processing unit; a transmitter and receiver for Wi-Fi communication; and firmware including rate control and interference mitigation code to provide interference-aware link-rate adaptation, wherein the access point is to receive data regarding wireless signals received by access point, the access point to provide Wi-Fi communication, the wireless signals being communicated in an unlicensed radio spectrum, perform spectral analysis of the received wireless signals to identify a channel of an LTE (Long-Term Evolution) signal, and upon determining that energy level of the LTE signal is below an energy detection (ED) level and that the channel is a primary Wi-Fi channel for the access point, adapting a link rate for the access point based on channel state information for the channel.

A method for interference aware rate adaptation includes receiving data regarding wireless signals received by Wi-Fi access point, wherein the wireless signals are communicated in an unlicensed radio spectrum; performing spectral analysis of the received wireless signals to identify a channel of an LTE (Long-Term Evolution) signal; determining whether an energy level of the LTE signal is above or below an energy detection (ED) level; upon determining that energy level of the LTE signal is below the ED level and that the channel is a primary Wi-Fi channel for the access point, adapting a link rate for the access point based on channel state information for the channel; and upon determining that energy level of the LTE signal is above the ED level and that the channel is a secondary Wi-Fi channel for the access point, adapting spectrum allocation for the access point to avoid the channel.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:

receiving data regarding wireless signals received by an access point, the access point to provide Wi-Fi communication, the wireless signals being communicated in an unlicensed radio spectrum;

performing spectral analysis of the received wireless signals to identify a channel of an LTE (Long-Term Evolution) signal; and upon determining that energy level of the LTE signal is below an energy detection (ED) level and that the channel is a primary Wi-Fi channel for the access point, adapting a link rate for the access point based at least in part on channel state information for the channel;

upon determining that energy level of the LTE signal is above the ED level and that the channel is a secondary Wi-Fi channel for the access point, adapting spectrum allocation for the access point to avoid the channel;

maintaining data for one or more detection metrics in a set of variables; and applying one or more detection conditions based on the set of detection metrics to detect clients of the access point that are affected by interference caused by the LTE signal.

2. The one or more mediums of claim 1, further comprising executable computer program instructions that, when executed by the one or more processors, cause the one or more processors to perform operations comprising:

maintaining additional data for a number of transmissions, an LTE detection bitmap, channel state information, and bandwidth tried under LTE detection in the set of variables.

3. The one or more mediums of claim 1, wherein the one or more detection conditions include a first detection condition based on numbers of transmission retries required to send a frame.

4. The one or more mediums of claim 1, wherein the one or more detection conditions include a second detection condition for LTE on the primary Wi-Fi channel based on PHY data rate for the access point.

5. The one or more mediums of claim 1, wherein the one or more detection conditions include a third detection condition for LTE on the secondary Wi-Fi channel based on PHY data rate and bandwidth for the access point.

6. The one or more mediums of claim 1, wherein LTE interference mitigation code is implemented in a rate control class for the access point.

7. The one or more mediums of claim 1, wherein the LTE signal operates in the unlicensed radio spectrum under one of LTE-U (LTE-Unlicensed) or LAA (Licensed Assisted Access).

8. The one or more mediums of claim 1, wherein the unlicensed radio spectrum is the 5 GHz (Gigahertz) Unlicensed Spectrum.

9. An access point comprising:
a processor;
a transmitter and receiver for Wi-Fi communication; and
firmware including rate control and interference mitigation code to provide interference-aware link-rate adaptation, wherein the access point is to:
  receive data regarding wireless signals received by access point, the access point to provide Wi-Fi communication, the wireless signals being communicated in an unlicensed radio spectrum,
  perform spectral analysis of the received wireless signals to identify a channel of an LTE (Long-Term Evolution) signal, and
  upon determining that energy level of the LTE signal is below an energy detection (ED) level and that the channel is a primary Wi-Fi channel for the access point, adapting a link rate for the access point based at least in part on channel state information for the channel;
  upon determining that energy level of the LTE signal is above the ED level and that the channel is a secondary Wi-Fi channel for the access point, adapt spectrum allocation for the access point to avoid the channel; and
a memory, the access point to maintain data for one or more detection metrics in a set of variables in the memory, wherein the access point is to apply one or more detection conditions based on the set of detection metrics to detect clients of the access point that are affected by interference caused by the LTE signal.

10. The access point of the claim 9, wherein the access point is further to maintain additional data for a number of transmissions, an LTE detection bitmap, and bandwidth tried under LTE detection in the set of variables.

11. The access point of claim 9, wherein the access point operates under the IEEE 802.11ac or 802.11ax standards.

12. A method for interference aware rate adaptation comprising:
receiving data regarding wireless signals received by Wi-Fi access point, wherein the wireless signals are communicated in an unlicensed radio spectrum;
performing spectral analysis of the received wireless signals to identify a channel of an LTE (Long-Term Evolution) signal;
determining whether an energy level of the LTE signal is above or below an energy detection (ED) level;
upon determining that energy level of the LTE signal is below the ED level and that the channel is a primary Wi-Fi channel for the access point, adapting a link rate for the access point based at least in part on channel state information for the channel; and
upon determining that energy level of the LTE signal is above the ED level and that the channel is a secondary Wi-Fi channel for the access point, adapting spectrum allocation for the access point to avoid the channel;
upon determining that the LTE signal is not a signal with an energy below the ED level on the primary Wi-Fi channel and is not a signal with an energy above the ED level on the secondary Wi-Fi channel, performing no link rate adaption in response to the LTE signal.

13. The method of claim 12, further comprising:
maintaining data for one or more detection metrics in a set of variables; and
applying one or more detection conditions based on the set of detection metrics to detect clients of the access point that are affected by interference caused by the LTE signal.

14. The method of claim 13, further comprising:
maintaining additional data for a number of transmissions, an LTE detection bitmap, channel state information, and bandwidth tried under LTE detection in the set of variables.

15. The method of claim 12, wherein adapting a link rate for the access point is further based on traffic type for signal traffic.

* * * * *